United States Patent
Arunachalam et al.

(10) Patent No.: US 10,331,691 B2
(45) Date of Patent: *Jun. 25, 2019

(54) METADATA REFINEMENT USING BEHAVIORAL PATTERNS

(71) Applicant: eBay Inc., San Jose, CA (US)

(72) Inventors: Prakash S. Arunachalam, Palo Alto, CA (US); Jean-David Ruvini, Los Gatos, CA (US); Hugh Evan Williams, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,811

(22) Filed: Dec. 6, 2017

(65) Prior Publication Data

US 2018/0096037 A1  Apr. 5, 2018

Related U.S. Application Data

(63) Continuation of application No. 15/409,612, filed on Jan. 19, 2017, now Pat. No. 9,881,067, which is a continuation of application No. 14/138,032, filed on Dec. 21, 2013, now Pat. No. 9,582,823.

(60) Provisional application No. 61/836,068, filed on Jun. 17, 2013.

(51) Int. Cl.
| | |
|---|---|
| *G06F 16/248* | (2019.01) |
| *G06F 16/28* | (2019.01) |
| *G06Q 10/08* | (2012.01) |
| *G06Q 30/06* | (2012.01) |

(52) U.S. Cl.
CPC .......... *G06F 16/248* (2019.01); *G06F 16/285* (2019.01); *G06Q 10/087* (2013.01); *G06Q 30/0623* (2013.01)

(58) Field of Classification Search
CPC ......... G06F 17/30554; G06F 17/30598; G06F 16/248; G06F 16/285; G06Q 10/087; G06Q 30/0623
See application file for complete search history.

(56) References Cited

U.S. PATENT DOCUMENTS

| | | | |
|---|---|---|---|
| 8,275,666 B2 | 9/2012 | Chang et al. | |
| 8,280,894 B2 | 10/2012 | Bohn et al. | |
| 8,495,057 B2 | 7/2013 | Palermiti, II et al. | |
| 8,682,819 B2 | 3/2014 | Consul et al. | |

(Continued)

OTHER PUBLICATIONS

Final Office Action received for U.S. Appl. No. 14/138,032, dated Mar. 29, 2016, 12 pages.

(Continued)

*Primary Examiner* — Jorge A Casanova
(74) *Attorney, Agent, or Firm* — Shook, Hardy & Bacon L.L.P.

(57) ABSTRACT

A system and method of metadata refinement using behavioral patterns is disclosed. In some embodiments, user behavioral data for results of a search query is received. The results can include an untagged item and a plurality of tagged items. A determination can then be made that the tagged items have been assigned a plurality of types of metadata. The untagged item can then be identified as a candidate to be tagged with at least one of the plurality of types of metadata assigned to the tagged items. In some embodiments, the user behavioral data comprises clickstream data indicating that a user selected the untagged item and at least one of the tagged items during a single search event.

20 Claims, 9 Drawing Sheets

(56) References Cited

U.S. PATENT DOCUMENTS

| | | |
|---|---|---|
| 9,582,823 B2 | 2/2017 | Arunachalam et al. |
| 9,881,067 B2 | 1/2018 | Arunachalam et al. |
| 2013/0268551 A1 | 10/2013 | Nikankin |
| 2014/0372253 A1 | 12/2014 | Arunachalam et al. |
| 2017/0132297 A1 | 5/2017 | Arunachalam et al. |

OTHER PUBLICATIONS

Non-Final Office Action received for U.S. Appl. No. 14/138,032, dated Jun. 27, 2016, 6 pages.
Non-Final Office Action received for U.S. Appl. No. 14/138,032, dated Nov. 3, 2015, 14 pages.
Notice of Allowance received for U.S. Appl. No. 14/138,032, dated Oct. 17, 2016, 5 pages.
Final Office Action received for U.S. Appl. No. 15/409,612, dated Aug. 23, 2017, 7 pages.
First Action Interview—Pre-interview Communication received for U.S. Appl. No. 15/409,612, dated Mar. 21, 2017, 5 pages.
Notice of Allowance received for U.S. Appl. No. 15/409,612, dated Oct. 13, 2017, 5 pages.

METADATA REFINEMENT USING BEHAVIORAL PATTERNS

CROSS-REFERENCE TO RELATED APPLICATIONS

This application is a continuation of and claims the benefit of priority to U.S. application Ser. No. 15/409,612, filed on Jan. 19, 2017, which is a continuation of and claims the benefit of priority to U.S. application Ser. No. 14/138,032, filed on Dec. 21, 2013, which claims priority to U.S. Provisional Application No. 61/836,068, filed on Jun. 17, 2013, each of which is hereby incorporated by reference in its entirety.

TECHNICAL FIELD

The present application relates generally to the technical field of data processing, and, in various embodiments, to systems and methods of metadata refinement using behavioral patterns.

BACKGROUND

Item metadata is important for online auction sites, as well as for other e-commerce sites. This metadata can be used for multiple purposes, including search, catalog and categorization, financial analytics, and data retention. The product identification (ID) assigned to an item being offered for sale is an important piece of metadata in certain e-commerce sites (e.g., eBay) since items can be transient, as they represent the actual deal or offer. Assigning a product ID to an item may provide advantages, specifically, category data, inventory intelligence, and item default inputs such as stock photo. Other item metadata may be useful as well. However, sometimes certain metadata for an item listing may be missing or may be incorrectly assigned.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
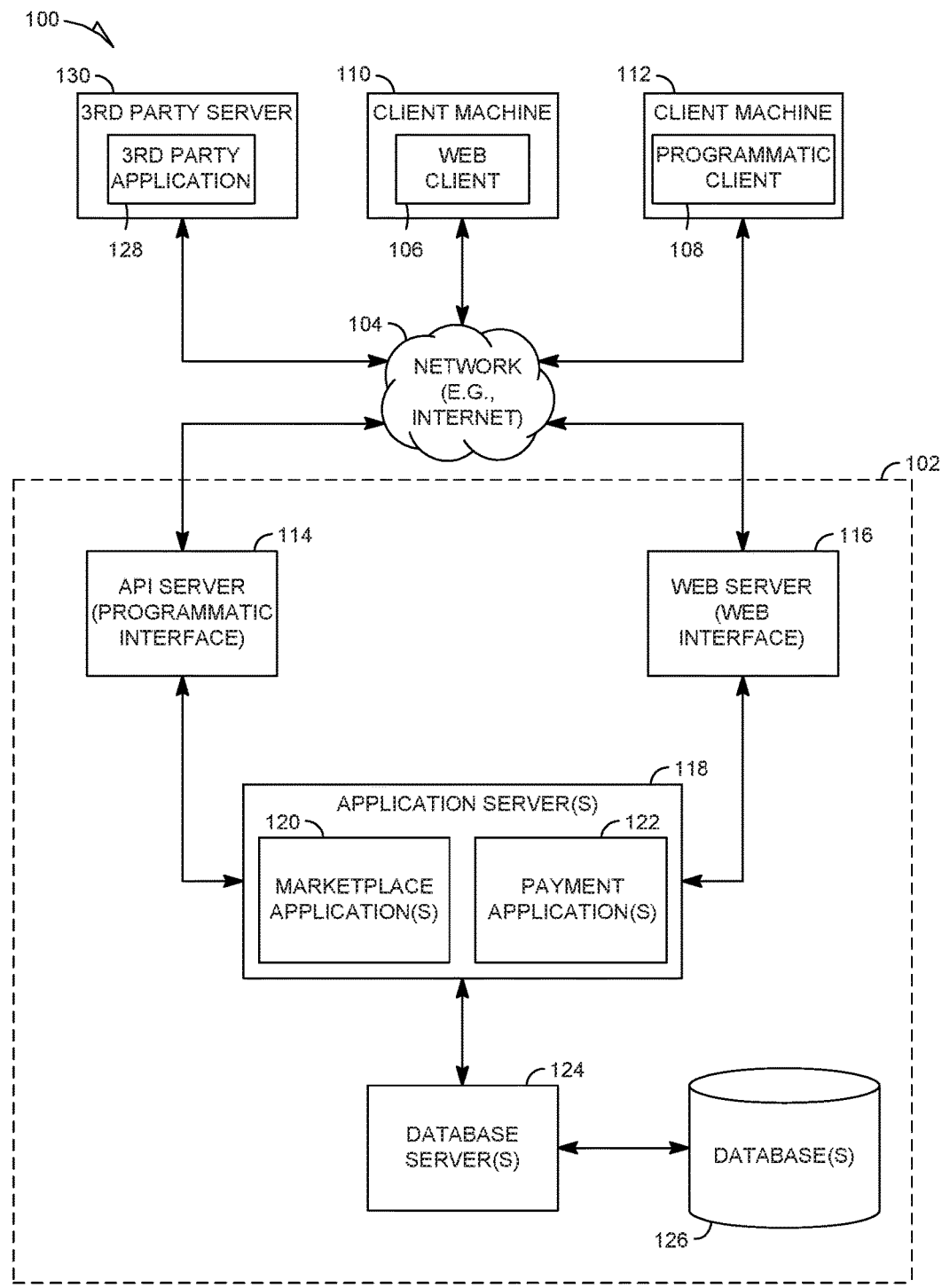
FIG. 1 is a block diagram depicting a network architecture of a system, according to some embodiments, having a client-server architecture configured for exchanging data over a network.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure describes techniques to improve the accuracy of metadata for listed items using behavioral data (e.g., user click-through data). In some embodiments, user (e.g., buyer or potential buyer) behavior can be used to improve the quality of metadata for listed items. In some embodiments, user behavior can be analyzed and used to assign metadata to an item listing. In some embodiments, user behavior can be analyzed and used to determine and correct an incorrect assignment of metadata to an item listing.

For example, in some embodiments, the buyer selections (e.g., clicks) of items that did not have a product ID can be used to identify these items as candidates for tagging. Conversely, in some embodiments, the items that have product ID's and that were not clicked by buyers can be used as candidates for mistagging (e.g., miscategorization or misproductization). A mistagged item is an item that has been tagged with incorrect metadata, such as an item that has been tagged with the wrong product ID. Although the present disclosure refers to product ID's, it is contemplated that the techniques disclosed herein may be applied to any type of metadata that is to be assigned to item listings. Examples of such metadata may include, but are not limited to, category ID, color, brand, and size. It is contemplated that other types of metadata are also within the scope of the present disclosure.

In some embodiments, a method comprises receiving user behavioral data for results of a search query. The results can include an untagged item and a plurality of tagged items. A determination can then be made that the tagged items have been assigned a first type of metadata not assigned to the untagged item. The untagged item can then be identified as a candidate to be tagged with the first type of metadata assigned to the tagged items based on the user behavioral data.

In some embodiments, the user behavioral data comprises clickstream data indicating that a user selected the untagged item and the tagged items during a single search event. In some embodiments, the method further comprises determining whether all of the tagged items selected during the single search event have identical metadata for the first type of metadata, determining a majority metadata in response to a determination that all of the tagged items selected during the single search event do not have identical metadata, wherein the majority metadata is metadata that is commonly assigned to a majority of the tagged items selected during the single search event, and identifying the majority metadata as data with which to tag the untagged item. In some embodiments, the method further comprises providing a notification to an administrator, wherein the notification indicates that the majority metadata should be assigned to the untagged item. In some embodiments, the method further comprises automatically assigning the majority metadata to the untagged item.

In some embodiments, the step of identifying the untagged item as a candidate to be tagged with the first type of metadata assigned to the tagged items is further based on a determination that the untagged item and the tagged items have identical metadata for a second type of metadata, wherein the second type of metadata is different from the first type of metadata. In some embodiments, the first type of metadata is a product identification and the second type of metadata is a category identification.

In some embodiments, the method further comprises providing a notification to an administrator in response to the identification of the untagged item as a candidate to be tagged with the first type of metadata assigned to the tagged items, wherein the notification indicates that data corresponding to the first type of metadata for the tagged items should be assigned to the untagged item. In some embodiments, the method further comprises automatically assigning data corresponding to the first type of metadata for the tagged items to the untagged item in response to the identification of the untagged item as a candidate to be tagged with the first type of metadata assigned to the tagged items.

In some embodiments, the type of metadata is a product identification. In some embodiments, the type of metadata is one of a category identification, color, brand, or size.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
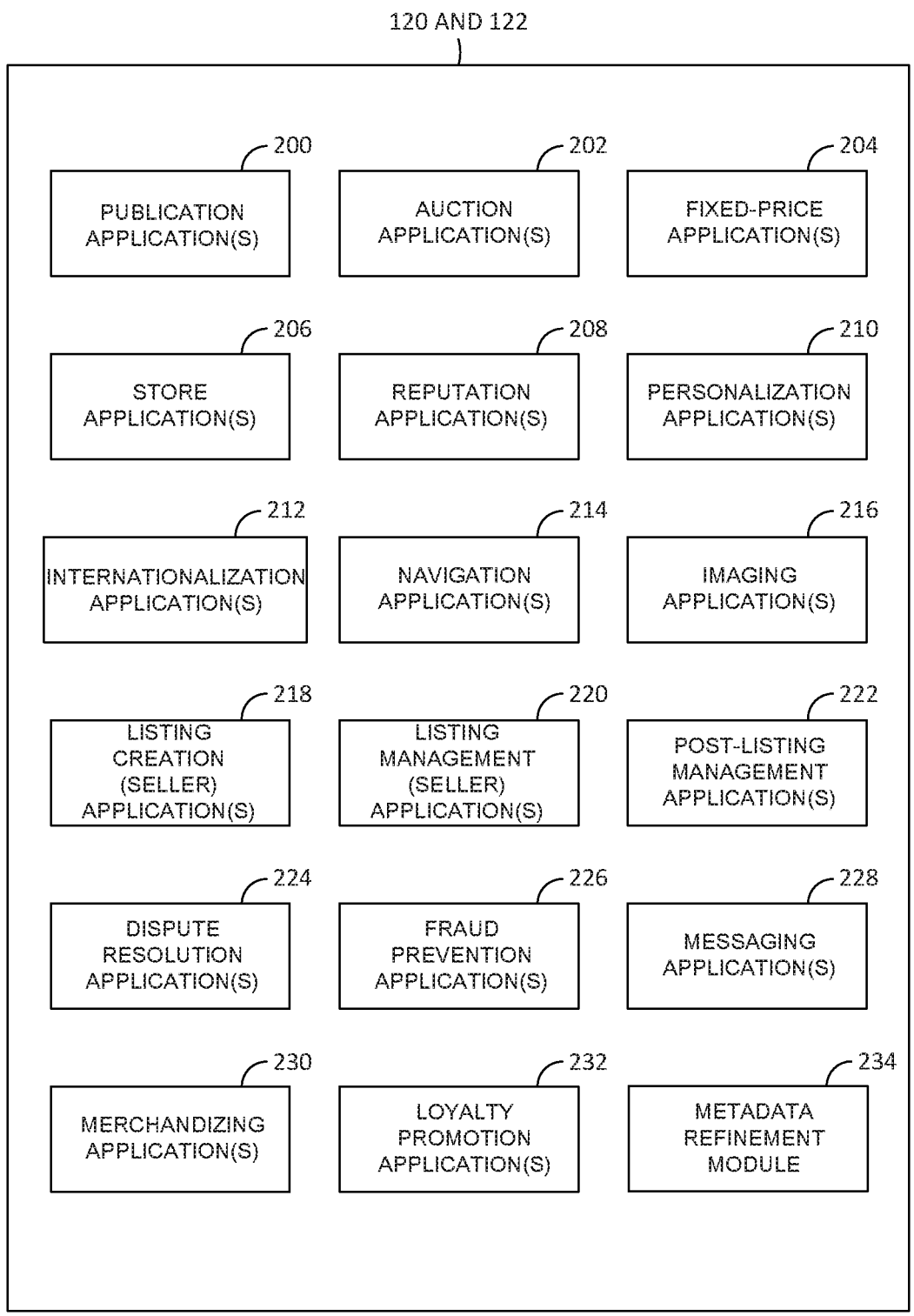
FIG. 2 is a block diagram depicting various components of a network-based publisher, according to some embodiments.

FIG. 2 is a block diagram illustrating multiple marketplace and payment applications 120 and 122 that, in one example embodiment, are provided as part of the networked system 102. Alternate solutions may include other combinations of these modules. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may, furthermore, access one or more databases 126 via the database servers 124. The slide checkout mechanism disclosed herein may be integrated with any or all of the applications described hereinbelow. Some examples of such integration are provided; however, other applications may also have integrations consistent with this disclosure.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller. The store applications 206 may support an online webstore, such as a hosted solution, where the webstore integrates with the slide checkout mechanism to enable users to easily use the webstore application on a mobile device, wherein the item and item identifier are provided by the store. According to some embodiments, the slide checkout cursor is configured according to input from the store, such as where the cursor is designed and presented to the user having the look and feel of the store. Further, the organization of the information presented to the user may be specific to the store.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page on which information regarding transactions to which the user is (or has been) a party may be viewed. Further, a personalization application 210 may enable a user to personalize listings and other aspects of their interactions with the networked system 102 and other parties. The personalization application(s) 210 may integrate with the slide checkout mechanism such that the user's information is used to generate the selections and options available. In some embodiments, the user is able to specify their preferences, such as incorporate specific payment options, addresses and other considerations. For example, the user may specify that when a particular shipping address is selected, then a selection to identify the item as a gift will be presented on the display; when the user slides over the gift option, a gift receipt is provided with the item, or a gift card is provided with the item.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116. The internationalization applications 212 may integrate with the slide checkout mechanism to provide specific configurations for a geographical area. For example, in Japan, the display may provide the various selection items from right to left, consistent with the reading order for Japanese consumers.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make the listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

A metadata refinement module 234 may be configured to perform any combination of functions related to metadata refinement disclosed herein. Such functions have been discussed above and will be further discussed below.

Figure 3:
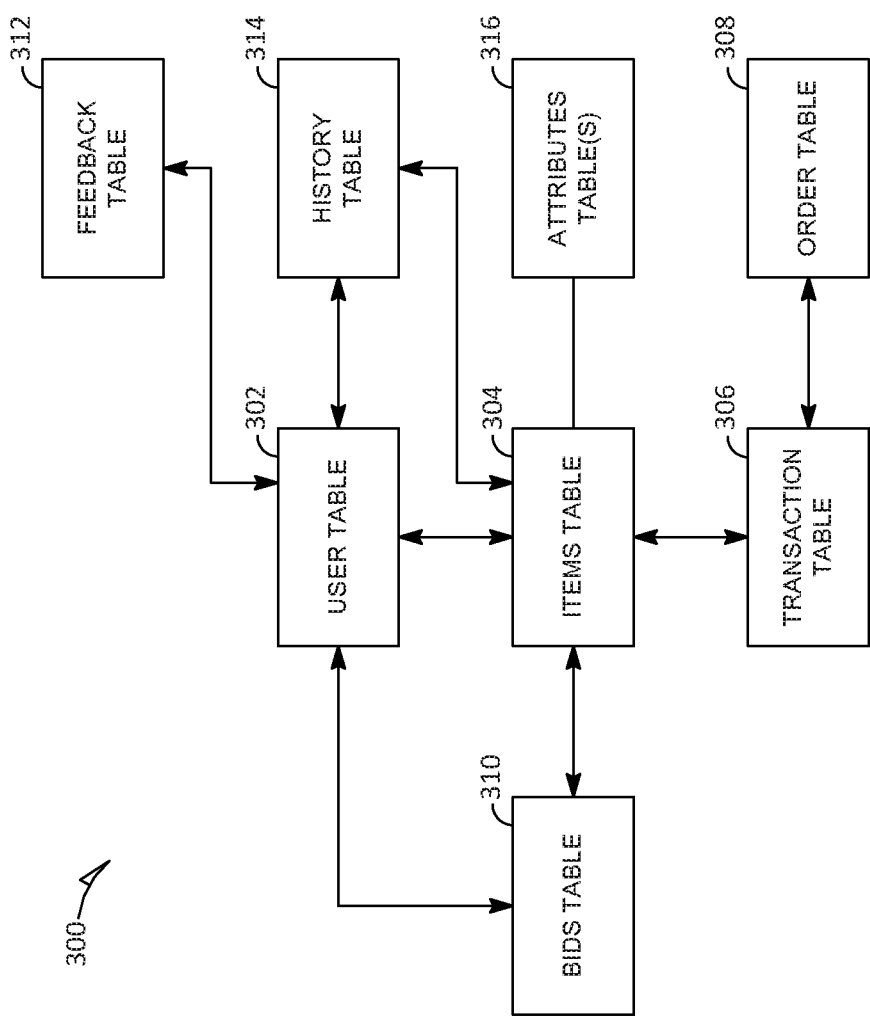
FIG. 3 is a block diagram depicting an example embodiment of various tables that may be maintained within a database.

FIG. 3 is a high-level entity-relationship diagram, illustrating various tables 300 that may be maintained within the database(s) 126, and that are utilized by and support the applications 120 and 122. A user table 302 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 may furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, each order record being associated with an order. Each order, in turn, may be associated with one or more transactions for which records exist within the transaction table 306.

Bid records within a bids table 310 each relate to a bid received at the networked system 102 in connection with an auction-format listing supported by an auction application 202. A feedback table 312 is utilized by one or more reputation applications 208, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 may indicate a currency attribute associated with a particular item, the currency attribute identifying the currency of a price for the relevant item as specified by a seller.

Figure 4:
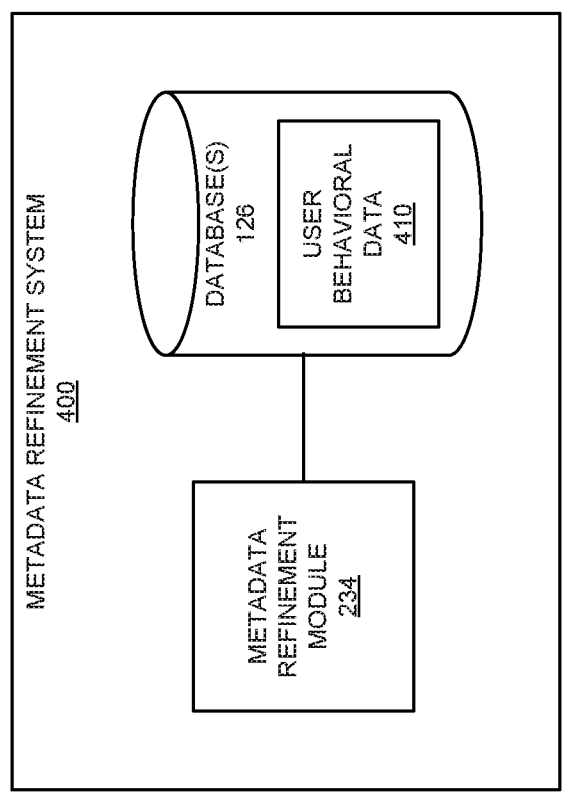
FIG. 4 illustrates a metadata refinement system, in accordance with an example embodiment.

FIG. 4 illustrates a metadata refinement system 400, in accordance with an example embodiment. The metadata refinement system 400 may comprise metadata refinement module 234. The metadata refinement module 234 may be configured to identify and/or tag items that are lacking certain metadata based on an analysis of user behavioral data 410, such as by using any of the techniques discussed below. The metadata refinement module 234 may additionally or alternatively be configured to identify items that have been mistagged with incorrect metadata based on an analysis of user behavioral data 410, such as by using any of the techniques discussed below. The user behavioral data 410 may comprise clickstream data. However, it is contemplated that other types of user behavioral data 410 are also within the scope of the present disclosure. The user behavioral data 410 may be stored in one or more databases 126, where it may be accessed by the metadata refinement module 234.

A. Untagged Items

As mentioned above, in some embodiments, the metadata refinement module 234 may be configured to identify and/or tag items that are lacking certain metadata based on user behavioral data 410. For the purposes of this disclosure, an item that lacks a certain type of metadata may be referred to as an untagged item, while items that have that certain type of metadata may be referred to as tagged items. For example, in response to a search query, a search results page may be generated and presented comprising a plurality of item listings. Some of the item listings may have product ID's and some of the item listings may lack product ID's. The item listings that have product ID's may be referred to as tagged items, while the item listings that lack product ID's may be referred to as untagged items. As previously discussed, in addition to product ID, other types of metadata are also within the scope of the present disclosure, including, but are not limited to, category ID, color, brand, and size.

In some embodiments, when a user clicks on, or otherwise selects, an untagged item during the same search event or session in which tagged items have also been clicked, or otherwise selected, this co-click data may be used to infer that the untagged item should be tagged with the same metadata as the tagged items that were selected. In this way, an item listing that is missing a product ID may be assigned the same product ID as other item listings that were also selected during the same search event or session. The same technique may be used for other types of metadata as well.

Figure 5:
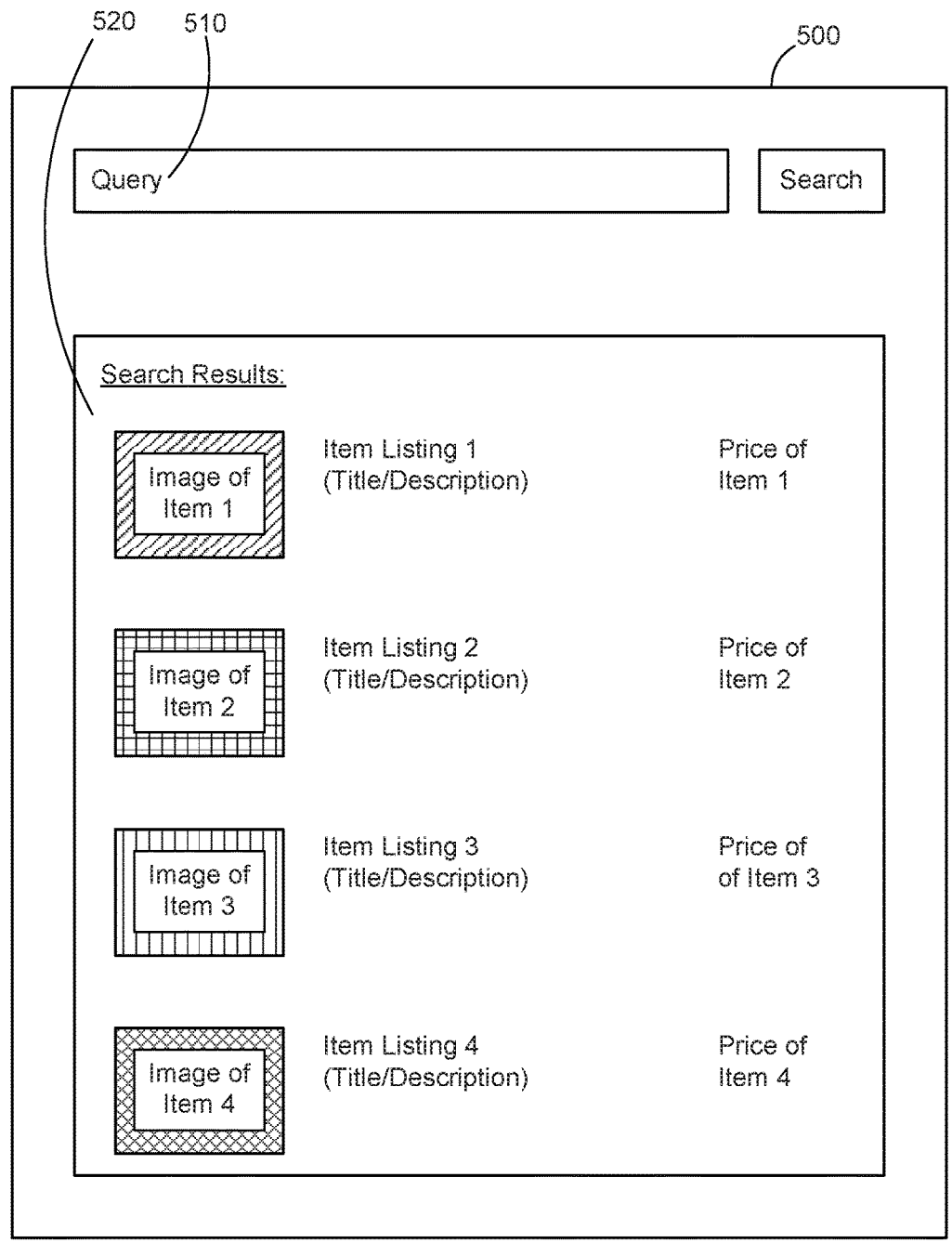
FIG. 5 illustrates an example embodiment of a search results page.

FIG. 5 illustrates an example embodiment of a search results page 500 presenting search results 520 to a user in response to the user submitting a search query 510. The search results 520 may comprise multiple item listings (e.g., item Listing 1, Item Listing 2, etc.). The item listings may be represented or identified by a title and/or a description of the corresponding item. The search results may also comprise an image of the corresponding item for each item listing (e.g., Image of Item 1, Image of Item 2, etc.), as well as a price of the corresponding item for each item listing (e.g., Price of Item 1, Price of Item 2, etc.). It is contemplated that the search results 520 may comprise a different number of item listings than those shown in FIG. 5, and that the search results for a single search query 510 may span multiple pages (e.g., in a scenario where a query results in one-hundred item listings being provided as search results, the one-hundred item listings may be presented to the user across multiple pages with twenty-five item listings on each page).

In one example of a scenario for the search results page 500 in FIG. 5, let's say that Item Listings 1, 3, and 4 are tagged items, each one having been tagged with the same product ID, while Item Listing 2 is an untagged item that lacks any item product ID. If a user clicks on Item Listing 2 during the same search event or session in which he or she clicks on a predetermined minimum threshold number of the tagged items (e.g., item Listings 1, 3, or 4), then that user behavioral data may be used to determine that Item Listing 2 should be tagged with the same product ID as the tagged items that were co-clicked. This determination may then be used to assign that product ID to item Listing 2 automatically during back-end processing or may be presented to a responsible party (e.g., seller or administrator) to prompt a manual assignment of that product ID to Item Listing 2.

It is contemplated that different criteria may be used for determining whether an untagged item should be tagged with certain metadata of tagged items. Different embodiments of criteria that may be used are discussed below. Criteria other than those explicitly disclosed herein may also be used and are within the scope of the present disclosure.

Items clicked, or otherwise selected, by buyers (or users) in a session can have patterns. Identification of situations where untagged items (e.g., items having no product ID) should be tagged with metadata (e.g., product ID) of tagged items (e.g., items having a product ID) may be based on either of the following conditions:
  1) the items with no product ID have been co-clicked with items having a product ID, where all the items having a product ID have the same product ID; or
  2) the items with no product ID have been co-clicked with items having a product ID, where there is more than one product ID amongst the items having a product ID (e.g., some items tagged with one product ID and other items tagged with a different product ID).

The coverage may increase using the second set of conditions above where the determination is based on the use of data from a group of items amongst which there is more than one product ID. However, in using this approach of obtaining data, errors may increase as well. The analysis may use either or both of the following mechanisms to increase accuracy:
  1) using leaf category ID matching between the untagged item and the tagged items; and
  2) using other metadata-based attribute value (e.g., brand, color, etc.) matching between untagged and tagged items.

I. Single Product ID (or Other Type of Metadata, e.g., Single Category ID)

This first condition mentioned above in the preceding paragraph deals with the case where all buyers in a collection or sampling of user behavioral data have selected (e.g., clicked) one or more untagged items, as well as items all having (e.g., being tagged with) the same product ID in a query. Here, the selected tagged items all have the same product ID or the same metadata for some other type of metadata e.g., the clicked tagged items all have the same category ID). In some embodiments, across all sessions where this untagged item is clicked, the tagged items that were clicked had the same product ID. The untagged item in the query search results may then be mapped to or tagged with this common product ID.

In some embodiments, an untagged item may be tagged with metadata of tagged items from the same search query session if certain requirements are met. It is contemplated that variations in these requirements are within the scope of the present disclosure.

In some embodiments, identification of a product ID with which to tag an untagged item (e.g., an item not yet having a product ID assigned to it), as well as the tagging of the untagged item with this identified product ID, may be based on or responsive to any combination of one or more of the following requirements being met:
  1) the query must have one untagged item clicked;
  2) the query must have at least 2 or more tagged items clicked with the same product ID, where this product ID may be the prospective product ID that the untagged item may be determined to correspond to and may be the metadata with which the untagged item may be tagged if all of the other appropriate requirements are satisfied;
  3) the untagged and tagged items must have the same leaf category ID; and
  4) the untagged item must correspond to the same product ID across all queries it is clicked in.

In some embodiments, identification of a product ID with which to tag an untagged item, as well as the tagging of the untagged item with this identified product ID, may be based on or responsive to any combination of one or more of the following requirements being met:
  1) the query must have one or more untagged items clicked;
  2) the query must have 2 or more tagged items clicked with the same product ID;
  3) the number of tagged items clicked must be more than the number of untagged items in the query;
  4) the untagged items clicked must correspond to the same product ID across all queries they are clicked in; and
  5) the untagged and tagged items must have the same leaf category ID.

In some embodiments, identification of a product ID with which to tag an untagged item, as well as the tagging of the untagged item with this identified product ID, may be based on or responsive to any combination of one or more of the following requirements being met:
  1) the query has one untagged clicked item;
  2) the query must have at least 2 or more tagged items clicked with the same product ID;
  3) the untagged and tagged items must have the same other-metadata tag, where the other-metadata tag is some other type of metadata other than that which the untagged item is missing (e.g., if the untagged item is missing a product ID, an other-metadata tag may be a category ID; in this example, the untagged and tagged items must have the same category ID); it is contemplated that different types and different numbers of other-metadata tags may be employed in this requirement; examples of other types of other-metadata tags include, but are not limited to, brand, color, weight, gender, and frame material; and 4) the untagged items must correspond to the same product D across all queries they are clicked in.

II. Multiple Product ID's (or Other Type of Metadata, e.g., Multiple Category ID's)

Here, with this condition, the restriction of having only one product ID for all the tagged items and finding the majority product ID to use for the tagging is relaxed. For example, there may be different product ID's or different metadata for some other type of metadata (e.g., where ¾ of the clicked tagged items have category ID #1 and ¼ of the clicked tagged items have category ID #2) for the clicked tagged items in a collection or sampling of user behavioral data. In some embodiments, identification of a product ID with which to tag an untagged item, as well as the tagging of the untagged item with this identified product ID, may be based on or responsive to any combination of one or more of the following requirements being met:

1) the query must have one untagged clicked item;
2) the query must have at least 3 or more tagged items clicked;
3) all the tagged items must have one product ID that occurs in more than 50% of the clicked items that have product ID's (named as majority product ID); and
4) the untagged item must have the same leaf product ID as the tagged items with majority product ID.

Figure 6:
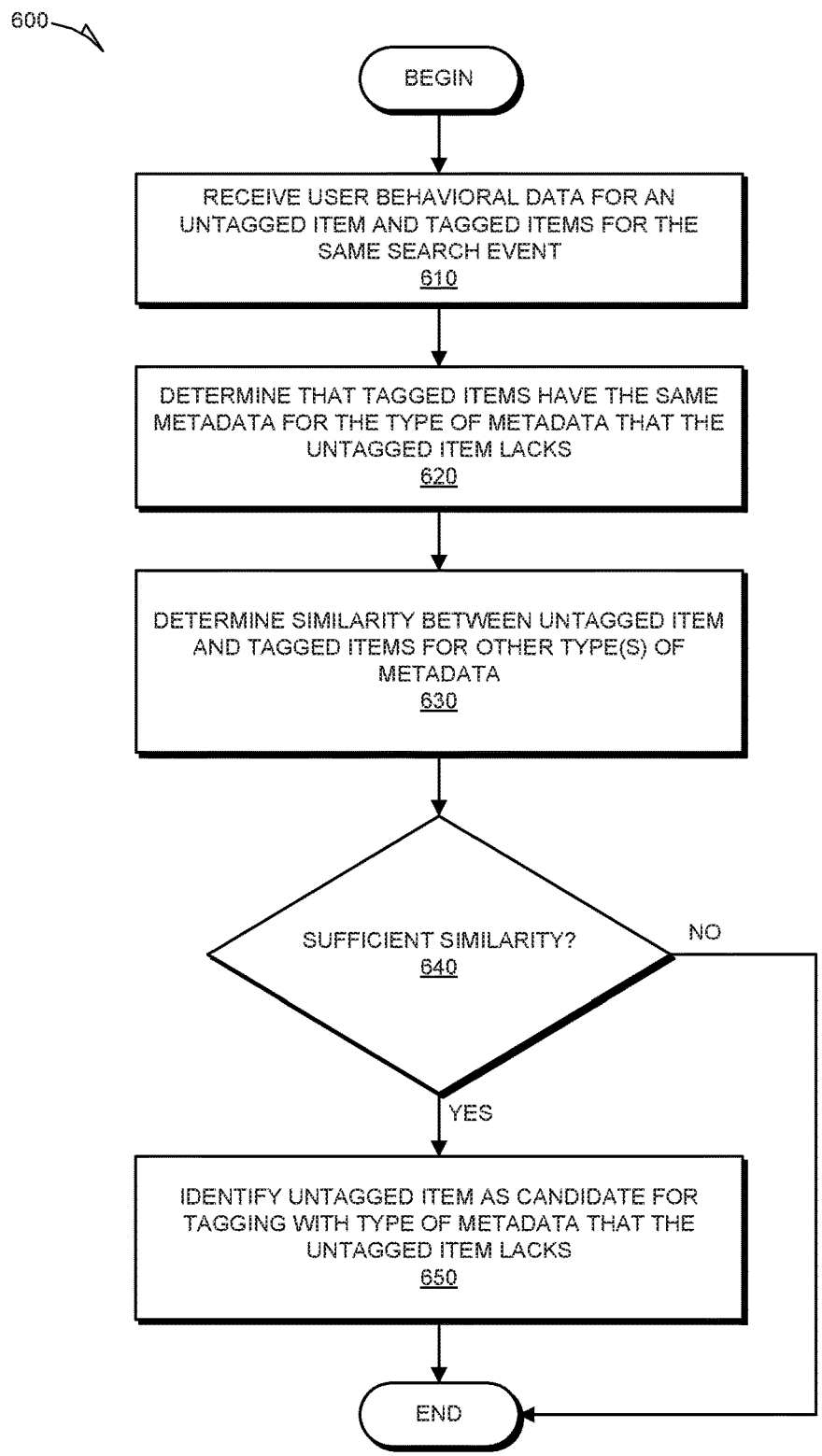
FIG. 6 is a flowchart illustrating an example method of identifying an untagged item.

FIG. 6 is a flowchart illustrating an example method 600 of identifying an untagged item. The operations of method 600 may be performed by a system or modules of a system (e.g., system 400 or any of its modules). At operation 610, user behavioral data (e.g., clickstream data) may be received (e.g., collected or sampled) for an untagged item and tagged items for the same search event (e.g., same search query).

At operation 620, it may be determined that all of the tagged items have the same metadata for the type of metadata that the untagged item lacks. For example, the tagged items may all have the same product ID, while the untagged item lacks any product ID at all.

At operation 630, the similarity between the untagged item and the tagged items may be determined. This similarity may be based on a similarity measurement between one or more other types of metadata for the untagged item and tagged items. For example, the similarity between the category ID's of the tagged item and the untagged items may be determined. It is contemplated that other types of metadata or attributes may be used for this similarity determination.

At operation 640, it is determined whether or not the untagged item has sufficient similarity to the tagged items. In some embodiments, sufficient similarity is determined based on a threshold level of similarity. In some embodiments, the threshold level of similarity is identical matching. For example, the category ID's may be required to be identical in order to satisfy the threshold level of similarity. However, it is contemplated that other threshold levels of similarity may be employed. If it is determined that there is not sufficient similarity, then the method 600 may terminate.

If it is determined that there is sufficient similarity, then, at operation 650, the untagged item may be identified as a candidate for tagging with the type of metadata that it lacks. In some embodiments, a notification is provided to an administrator in response to the identification of the untagged item as a candidate to be tagged with the first type of metadata assigned to the tagged items. The notification can indicate that data corresponding to the first type of metadata for the tagged items should be assigned to the untagged item. In some embodiments, data corresponding to the first type of metadata for the tagged items is automatically assigned to the untagged item in response to the identification of the untagged item as a candidate to be tagged with the first type of metadata assigned to the tagged items.

B. Mistagged Items

As mentioned above, in some embodiments, the metadata refinement module 234 may additionally or alternatively be configured to identify items that have been mistagged with incorrect metadata based on user behavioral data 410. In some embodiments, buyer behavior may be used by the metadata refinement module 234 to find items that were wrongly tagged by sellers. The basic logic is to target an item that was not clicked on by buyers, though the buyers clicked on items below this item in the search results page. For example, referring back to FIG. 5, in one example of a scenario for the search results page 500, let's say that Item Listings 1, 2, 3, and 4 are all tagged with the same product ID. If a user clicks on Item Listings 1, 2, and 4, but not on Item Listing 3, then that user behavioral data may be used to determined that Item Listing 3 has been mistagged with that product ID. This determination may then be used to remove that product ID tagging for Item Listing 3 automatically during back-end processing or it may be presented to a responsible party (e.g., seller or administrator) to prompt a manual removal of that product ID from Item Listing 3. The idea here is that since the user did not click on Item Listing 3, but did click on Item Listing 4, which is presented below Item Listing 3 in the search results 520, the user probably decided not to click on Item Listing 3 (even though he or she probably saw it) because it was not relevant to the user's search query, or at least not as relevant as the item listings that were clicked (Item Listings 1, 2, and 4). Therefore, it can be inferred that Item Listing 3 has been mistagged.

In some embodiments, identification of a mistagged item (e.g., with an incorrect product ID) may be based on or responsive to any combination of one or more of the following requirements being met:

1) all the items clicked in the query must have the same product ID;
2) items that are not clicked must be seen above the last item clicked on in the query results page;
3) items that are not clicked must have the same product ID as the item clicked;
4) items targeted must not be clicked by any buyer across multiple queries; and
5) the correlation between the item title and product title (ID) must be low.

Figure 7:
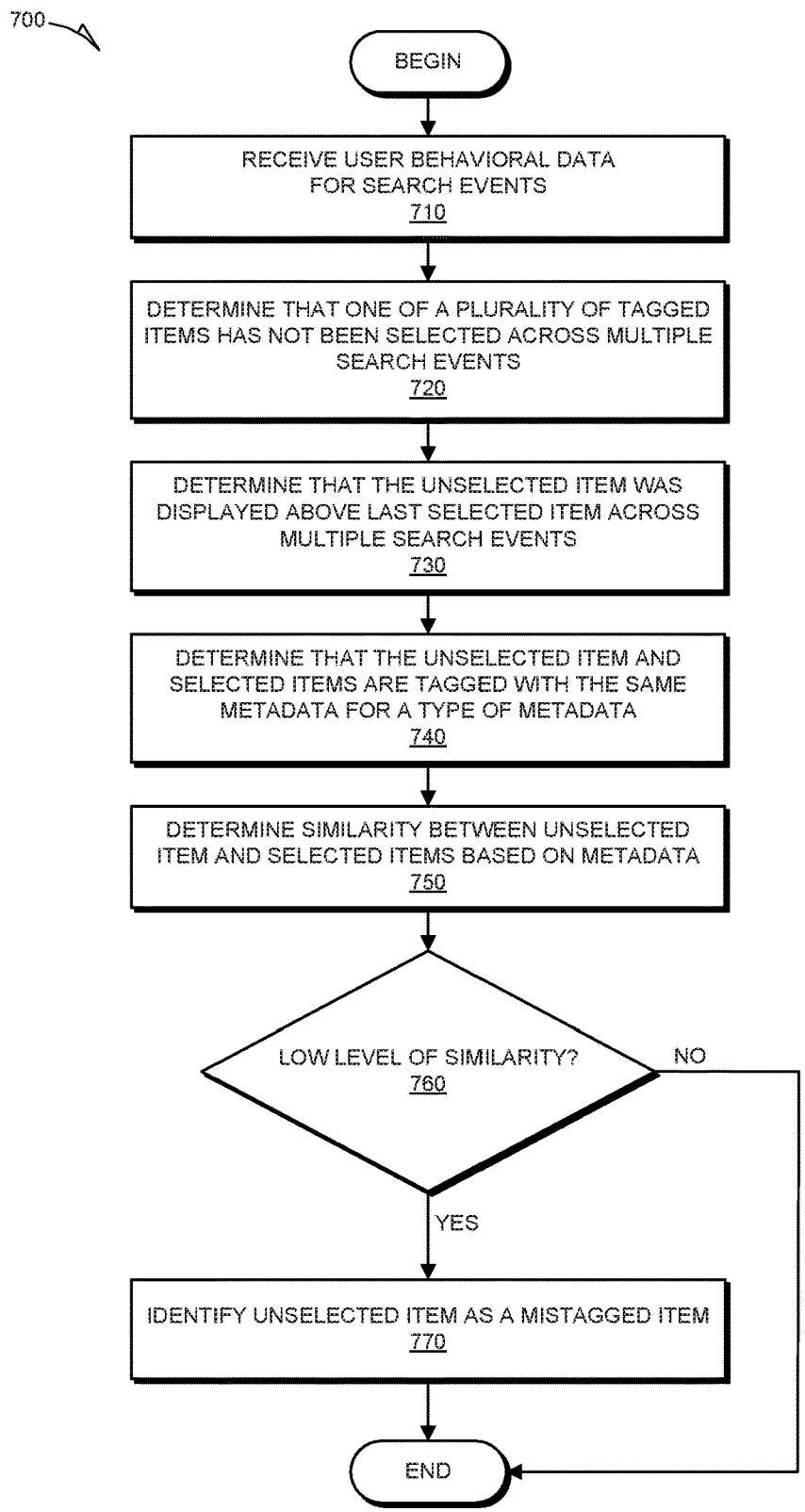
FIG. 7 is a flowchart illustrating an example method of identifying a mistagged item.

FIG. 7 is a flowchart illustrating an example method 700 of identifying a mistagged item. The operations of method 700 may be performed by a system or modules of a system (e.g., system 400 or any of its modules). At operation 710, user behavioral data (e.g., clickstream data) may be received (e.g., collected or sampled) across multiple search events (e.g., multiple search queries).

At operation 720, it may be determined that one of a plurality of tagged items has not been selected (e.g., not clicked by a user when displayed as part of search results) across the multiple search events.

At operation 730, it may be determined that the unselected item was displayed in a position above (or otherwise before) the last selected item for each of these multiple search events.

At operation 740, it may be determined that the unselected item and the selected items across these multiple search events are tagged with the same metadata (e.g., the same product ID) for a type of metadata (e.g., product ID).

At operation 750, similarity between the unselected item and the selected items may be determined based on metadata. For example, the similarity between the unselected item's title and the selected items' product ID may be measured.

At operation 760, it may be determined whether or not there is a low level of similarity between the unselected item and the selected items. For example, if the similarity measurement is below a predetermined level or threshold, then it may be determined that there is a low level of similarity. This similarity determination can be made by comparing aspects or metadata of the items (e.g., description, prices, images, etc.). If it is determined that there is not a low level of similarity, then the method 700 may terminate.

If it is determined that there is a low level of similarity, then, at operation 770, the unselected item may be identified as a mistagged item. Additionally, the mistagged item may then have its incorrect metadata (e.g., the incorrect product ID) removed or de-assigned automatically, or a notification may automatically be provided to the seller of the mistagged item or a site administrator indicating that the unselected item has been identified as having been mistagged.

Figure 8:
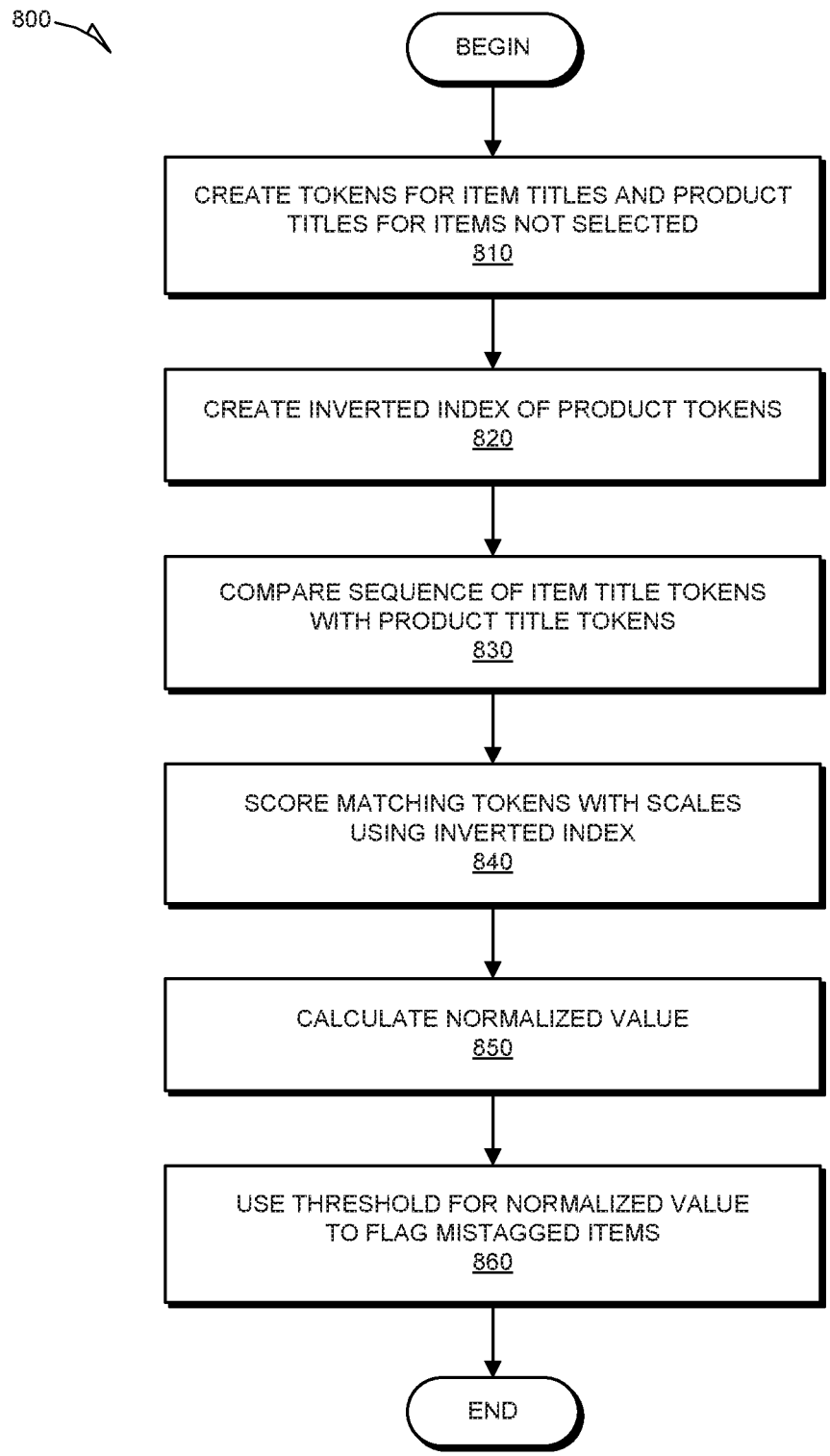
FIG. 8 is a flowchart illustrating an example method of using the correlation between item title and product title to determine if an item has been mistagged.

In some embodiments, previously-mentioned requirement 5 (the correlation between the item title and product title must be low) may be used to guarantee that the item was avoided by the user due to mistagging, as opposed to some other reason, such as pricing. FIG. 8 is a flowchart illustrating an example method 800 of using the correlation between item title and product title to determine if an item has been mistagged. In some embodiments, a determination of compliance with previously-mentioned requirement 5 may be made by employing method 800.

At operation 810, tokens can be created for item titles and product titles for items not selected (e.g., not clicked on). In some embodiments, aggressive tokenizing can be employed by breaking up words that have numericals and alphabets. Grouping can be used for boundary analysis and to mark broken words. At operation 820, an inverted index can be created of product tokens. At operation 830, the sequence of item title tokens can be compared with product title tokens using dynamic programming. In some embodiments, bigrams can be used to compare the tokens in order to improve accuracy. At operation 840, matching tokens can be scored with scales using the inverted index. At operation 850, a normalized value can be calculated using the minimum of the item title score and the product title score. In some embodiments, the normalized value can be calculated using the following equation:

Normalized value=score of matching tokens/max (min(item title score, product title score), 4).

At operation 860, a threshold for the normalized value can be used to flag items wrongly tagged (mistagged items). In some embodiments, a threshold of 0.3 may be used to find the wrongly tagged items. It is contemplated that other methods may be used to determine whether or not the correlation between the item title and product title (ID) is sufficiently low to identify an item as having been mistagged.

Although the examples above use product ID as the type of metadata with which an item is untagged or mistagged, other types of metadata may be the subject of the untagged or mistagged analysis disclosed herein. Examples of other types of metadata may include, but are not limited to, category ID, brand, color, price, gender, weight, and frame material.

It is contemplated that alternative embodiments to the requirements discussed above are within the scope of the present disclosure. Accordingly, additions, deletions, and changes may be made to the requirements disclosed herein.

It is contemplated that any of the features and/or embodiments discussed herein may be combined or incorporated into any of the other features and/or embodiments.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
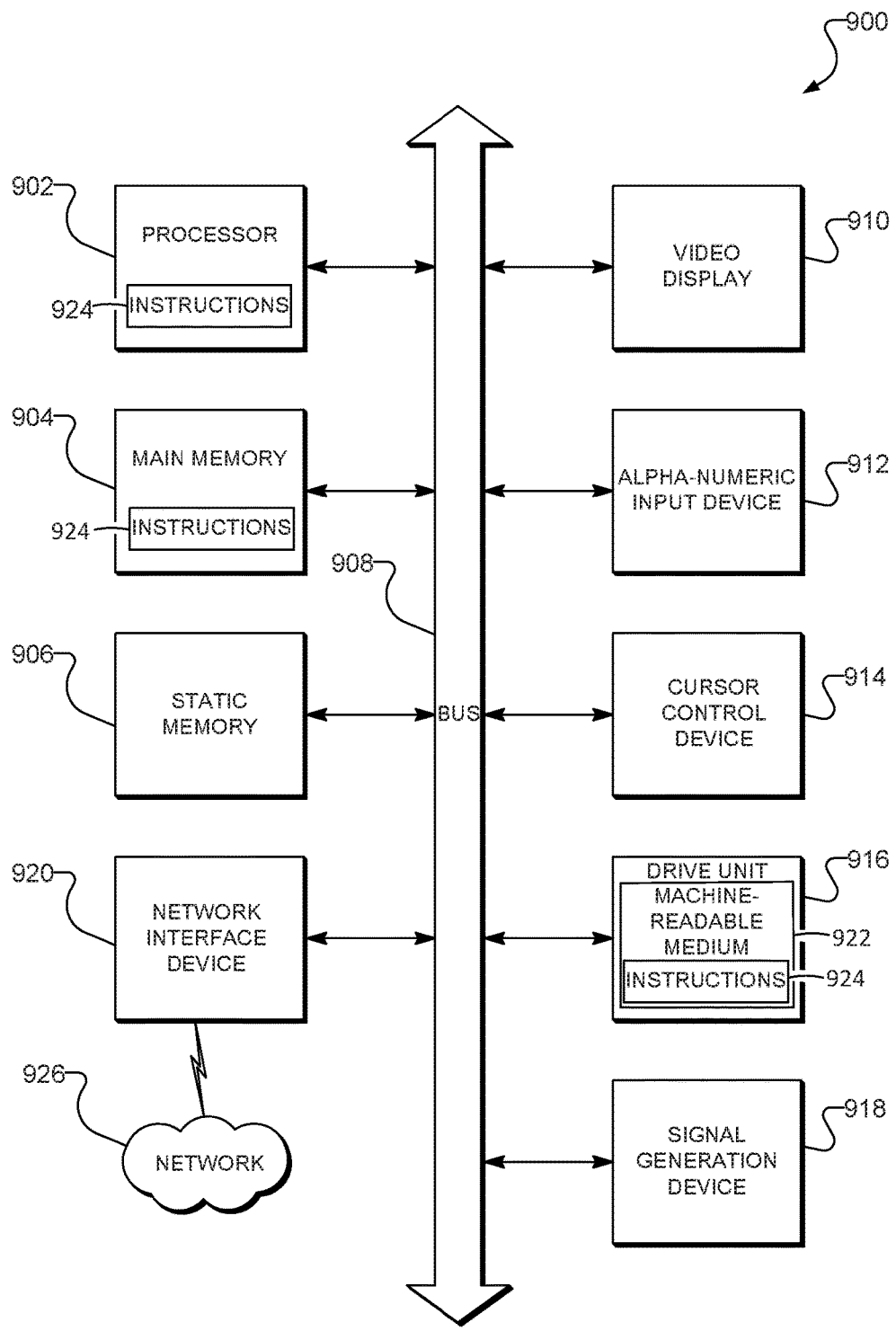
FIG. 9 shows a diagrammatic representation of a machine in the example form of a computer system within which a set of instructions may be executed to cause the machine to perform any one or more of the methodologies discussed herein, in accordance with an example embodiment.

FIG. 9 is a block diagram of a machine in the example form of a computer system 900 within which instructions 924 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving user behavioral data for search results of a search query, the user behavioral data comprising clickstream data indicating that a user selected the search results including a selection of an untagged item and a plurality of tagged items during a single search event;
   determining that the selected plurality of tagged items corresponds to a plurality of types of metadata and determining that the untagged item and at least one of the tagged items are selected during the single search event;
   identifying, by a machine having a memory and at least one processor, the untagged item as a candidate to be tagged with at least one of the plurality of types of metadata corresponding to the tagged items based on the determined plurality of tagged items corresponding to the at least one of the plurality of types of metadata, based on the untagged item and at least one of the tagged items having a same leaf category identifier, and based on the untagged item and at least one of the tagged items having another same metadata-based attribute value; and
   assigning data corresponding to the at least one of the plurality of types of metadata for the tagged items to the untagged item.

2. The method of claim 1, further comprising:
   determining whether all of the tagged items selected during the single search event have identical metadata for a first type of metadata;
   determining a majority metadata in response to a determination that all of the tagged items selected during the single search event do not have identical metadata, the majority metadata being metadata that is commonly assigned to a majority of the tagged items selected during the single search event; and
   identifying the majority metadata as data with which to tag the untagged item.

3. The method of claim 2, further comprising providing a notification to an administrator, the notification indicating that the majority metadata should be assigned to the untagged item.

4. The method of claim 2, further comprising automatically assigning the majority metadata to the untagged item.

5. The method of claim 1, wherein the identifying the untagged item as the candidate to be tagged is further based on a determination that the untagged item and at least one of the tagged items have identical metadata for a second type of metadata, the second type of metadata being different from the first type of metadata.

6. The method of claim 5, wherein the first type of metadata is a product identification and the second type of metadata is a category identification.

7. The method of claim 1, further comprising providing a notification to an administrator in response to the identification of the untagged item as a candidate to be tagged, the notification indicating that data corresponding to the first type of metadata for the tagged items should be assigned to the untagged item.

8. The method of claim 1, wherein the type of metadata is a product identification.

9. The method of claim 1, wherein the type of metadata is one of a category identification, a color, a brand, or a size.

10. A system comprising:
one or more hardware processors and a memory to store instructions that, when executed by the one or more hardware processors causes the one or more hardware processors to perform operations comprising:
receiving user behavioral data for search results of a search query, the user behavioral data comprising clickstream data indicating that a user selected the search results including a selection of an untagged item and a plurality of tagged items during a single search event;
determining that the selected plurality of tagged items corresponds to a plurality of types of metadata and determining that the untagged item and at least one of the tagged items are selected during the single search event;
identifying, by a machine having a memory and at least one processor, the untagged item as a candidate to be tagged with at least one of the plurality of types of metadata corresponding to the tagged items based on the determined plurality of tagged items corresponding to the at least one of the plurality of types of metadata, based on the untagged item and at least one of the tagged items having a same leaf category identifier, and based on the untagged item and at least one of the tagged items having another same metadata-based attribute value; and
assigning data corresponding to the at least one of the plurality of types of metadata for the tagged items to the untagged item.

11. The system of claim 10, further comprising:
determining whether all of the tagged items selected during the single search event have identical metadata for a first type of metadata;
determining a majority metadata in response to a determination that all of the tagged items selected during the single search event do not have identical metadata, the majority metadata being metadata that is commonly assigned to a majority of the tagged items selected during the single search event; and
identifying the majority metadata as data with which to tag the untagged item.

12. The system of claim 11, further comprising providing a notification to an administrator, the notification indicating that the majority metadata should be assigned to the untagged item.

13. The system of claim 11, further comprising automatically assigning the majority metadata to the untagged item.

14. The system of claim 10, wherein identifying the untagged item as the candidate to be tagged is further based on a determination that the untagged item and at least one of the tagged items have identical metadata for a second type of metadata, the second type of metadata being different from the first type of metadata.

15. The system of claim 10, further comprising providing a notification to an administrator in response to the identification of the untagged item as a candidate to be tagged, the notification indicating that data corresponding to the first type of metadata for the tagged items should be assigned to the untagged item.

16. A non-transitory machine-readable storage device storing a set of instructions that, when executed by at least one processor of a machine, causes the machine to perform operations comprising:
receiving user behavioral data for search results of a search query, the user behavioral data comprising clickstream data indicating that a user selected the search results including a selection of an untagged item and a plurality of tagged items during a single search event;
determining that the selected plurality of tagged items corresponds to a plurality of types of metadata and determining that the untagged item and at least one of the tagged items are selected during the single search event;
identifying, by a machine having a memory and at least one processor, the untagged item as a candidate to be tagged with at least one of the plurality of types of metadata corresponding to the tagged items based on the determined plurality of tagged items corresponding to the at least one of the plurality of types of metadata, based on the untagged item and at least one of the tagged items having a same leaf category identifier, and based on the untagged item and at least one of the tagged items having another same metadata-based attribute value; and
assigning data corresponding to the at least one of the plurality of types of metadata for the tagged items to the untagged item.

17. The non-transitory machine-readable storage device of claim 16, the operations further comprising:
determining whether all of the tagged items selected during the single search event have identical metadata for a first type of metadata;
determining a majority metadata in response to a determination that all of the tagged items selected during the single search event do not have identical metadata, the majority metadata being metadata that is commonly assigned to a majority of the tagged items selected during the single search event; and
identifying the majority metadata as data with which to tag the untagged item.

18. The non-transitory machine-readable storage device of claim 16, wherein the identifying the untagged item as the candidate to be tagged is further based on a determination that the untagged item and at least one of the tagged items have identical metadata for a second type of metadata, the second type of metadata being different from the first type of metadata.

19. The non-transitory machine-readable storage device of claim 18, wherein the first type of metadata is a product identification and the second type of metadata is a category identification.

20. The non-transitory machine-readable storage device of claim 16, the operations further comprising providing a notification to an administrator in response to the identification of the untagged item as a candidate to be tagged, the notification indicating that data corresponding to the first type of metadata for the tagged items should be assigned to the untagged item.

* * * * *